(12) United States Patent
Gaul (10) Patent No.: US 11,875,662 B2
(45) Date of Patent: Jan. 16, 2024

(54) DEVICE AND SYSTEM FOR VEHICLE PROXIMITY ALERT

(71) Applicant: Joseph Gaul, Warrington, PA (US)

(72) Inventor: Joseph Gaul, Warrington, PA (US)

(73) Assignee: Joseph Gaul, Warrington, PA (US)

( * ) Notice: Subject to any disclaimer, the term of this patent is extended or adjusted under 35 U.S.C. 154(b) by 0 days.

(21) Appl. No.: 18/049,305

(22) Filed: Oct. 25, 2022

(65) Prior Publication Data

US 2023/0135624 A1 May 4, 2023

Related U.S. Application Data

(60) Provisional application No. 63/273,107, filed on Oct. 28, 2021.

(51) Int. Cl.
*G08B 21/18* (2006.01)
*B60Q 5/00* (2006.01)
*B60Q 1/50* (2006.01)

(52) U.S. Cl.
CPC ............. *G08B 21/182* (2013.01); *B60Q 1/50* (2013.01); *B60Q 5/005* (2013.01)

(58) Field of Classification Search
CPC ............................... G08B 21/182; B60Q 5/005
See application file for complete search history.

(56) References Cited

U.S. PATENT DOCUMENTS

| | | | | |
|---|---|---|---|---|
| 11,488,467 B1* | 11/2022 | Nguyen | ............. | G08B 21/0476 |
| 2005/0073439 A1* | 4/2005 | Perricone | ................ | G06F 3/016 |
| | | | | 340/407.1 |
| 2011/0182321 A1* | 7/2011 | Yoshizaki | ................. | G01J 5/34 |
| | | | | 327/512 |
| 2016/0119539 A1* | 4/2016 | Tan | ........................ | G01S 5/0284 |
| | | | | 348/148 |
| 2016/0144817 A1* | 5/2016 | Chambers | ........... | B60R 21/0136 |
| | | | | 340/436 |
| 2016/0203717 A1* | 7/2016 | Ginsberg | ......... | G08G 1/096883 |
| | | | | 701/117 |
| 2016/0343251 A1* | 11/2016 | Lee | ..................... | G06V 40/1312 |
| 2016/0357235 A1* | 12/2016 | Messenger | ................ | G06F 1/28 |
| 2017/0088045 A1* | 3/2017 | Bezzina | .................. | G01S 15/02 |
| 2017/0203690 A1* | 7/2017 | Hada | .................. | B60G 17/0195 |
| 2019/0389483 A1* | 12/2019 | Likhterman | ...... | B60W 50/0098 |
| 2020/0010077 A1* | 1/2020 | Cormack | ............ | B60W 50/087 |
| 2020/0268301 A1* | 8/2020 | Alsbou | .................. | G08G 1/166 |
| 2020/0369265 A1* | 11/2020 | Fasihozaman | ........ | B60W 50/14 |
| 2021/0080950 A1* | 3/2021 | Tran | ........................ | A61B 5/18 |
| 2021/0188213 A1* | 6/2021 | Stabel | .................... | B60Q 5/005 |
| 2021/0407271 A1* | 12/2021 | Dubey | .................. | G08B 21/02 |
| 2022/0102966 A1* | 3/2022 | Tan | ........................ | H02H 7/222 |
| 2022/0382285 A1* | 12/2022 | Byrne | .................. | G08B 21/182 |

* cited by examiner

*Primary Examiner* — Sisay Yacob (74) *Attorney, Agent, or Firm* — Edison Law Group (57) ABSTRACT

A proximity detection device for a vehicle is shown and described. The proximity detection device for a vehicle includes a housing. The housing is made up of a solid exterior and an interior volume. The housing encloses at least one sensor which is operably coupled to a CPU. The CPU is then operably coupled to an alarm. The proximity detection device may be incorporated into a vehicle. Further, multiple proximity detection devices may be incorporated into a vehicle for any number of reasons.

17 Claims, 8 Drawing Sheets

DEVICE AND SYSTEM FOR VEHICLE PROXIMITY ALERT

CROSS REFERENCE TO RELATED APPLICATIONS

This application claims the benefit of U.S. Provisional Application No. 63/273,107 filed on Oct. 28, 2021. The above identified patent application is herein incorporated by reference in its entirety to provide continuity of disclosure.

BACKGROUND OF THE INVENTION

The present invention relates to a sensor and proximity warning system. More particularly, the present invention provides at least one device which detects proximity to the device based on at least motion.

Vehicles are an extremely useful tool for many individuals. In fact, some people use vehicles as their office space. This is beneficial to many professions. One of these professions is law enforcement. Officers spend large amounts of time in vehicles. This time is in some cases spent on patrol. In other cases, the vehicles are stationary. In times when officers are sitting stationary the officers are susceptible to potential danger from outside threats.

Current statistics show that ambushes of law enforcement in stationary vehicles have increased by 90 percent in the last 24 months. The view from inside the vehicle of the area surrounding the vehicle is obstructed by the vehicle itself. In darkness, the problem is compounded by limited visibility even through the windows. Inability to see or know whether danger is approaching puts personnel in danger and also contributes to high levels of stress and anxiety on the job.

The same is true of military personnel, except for often times in even more hostile environments. Any time a convoy is stationary there is a risk of potential ambush. Even with the personnel on constant alert additional security could still be beneficial. It is possible that individuals may sneak up from behind an object blocking them from field of view.

There is currently not a system or device on the market which will allow for persons inside a vehicle to detect approaching threats. Consequently, there is a need for an improvement in the art of vehicle proximity detection. The present invention substantially diverges in design elements from the known art while at the same time solves a problem many people face when sitting in a vehicle. In this regard the present invention substantially fulfills these needs.

SUMMARY OF THE INVENTION

The present invention provides a system and device for alerting vehicle occupants to exterior threats wherein the same can be utilized for providing convenience for the user when sitting in a vehicle and needing to be completely aware of one's surroundings. The proximity detection device for a vehicle includes a housing. The housing is made up of a solid exterior and an interior volume. The housing encloses at least one sensor which is operably coupled to a CPU. The CPU is then operably coupled to an alarm.

Another object of the proximity detection device for a vehicle is to include a first power source operably coupled to the at least one sensor and the CPU.

Another object of the proximity detection device is for it to be built within and to be part of a vehicle.

Another object of the proximity detection device for a vehicle is to include an alarm that is comprised of a speaker.

Another object of the proximity detection device for a vehicle is to include an alarm that is comprised of at least one light.

Another object of the proximity detection device for a vehicle is to include at least one sensor which is selected from the group consisting of: active sonar, radar, an infrared camera, a motion detector, and a visual spectrum camera.

Another object of the proximity detection device for a vehicle is to include a transceiver operably coupled to the CPU, wherein the CPU will send a notification via the transceiver to a third party.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

With regard to the reference numerals used, the following numbering is used throughout the drawings.

| | |
|---|---|
| 100 | proximity alert system |
| 101 | detection device |
| 102 | power source |
| 103 | transceiver |
| 104 | third party |
| 105 | alarm |
| 106 | computing device |
| 106a | CPU |
| 106b | memory |
| 106c | storage device |
| 106d | display |
| 107 | GPS |
| 108 | at least one light |
| 109 | at least one speaker |
| 200 | detection device |
| 201 | CPU |
| 202 | first sensor |
| 203 | at least one additional sensor |
| 204 | secondary power source |
| 205 | connection element |
| 301 | housing |
| 301a | interior volume |
| 302 | attachment points |
| 303 | mounting plate |

-continued

| | |
|---|---|
| 601 | system activated |
| 602 | sensors engaged |
| 603 | first proximity detection |
| 604 | alarm triggered |
| 605 | second proximity detection |
| 606 | second alarm triggered |
| 607 | notify third party of alarm |
| 608 | method stops |

DETAILED DESCRIPTION OF THE INVENTION

Reference is made herein to the attached drawings. Like reference numerals are used throughout the drawings to depict like or similar elements of the device and system for vehicle proximity alert. For the purposes of presenting a brief and clear description of the present invention, a preferred embodiment will be discussed as used for the device and system for vehicle proximity alert. The figures are intended for representative purposes only and should not be considered to be limiting in any respect.

Figure 1:
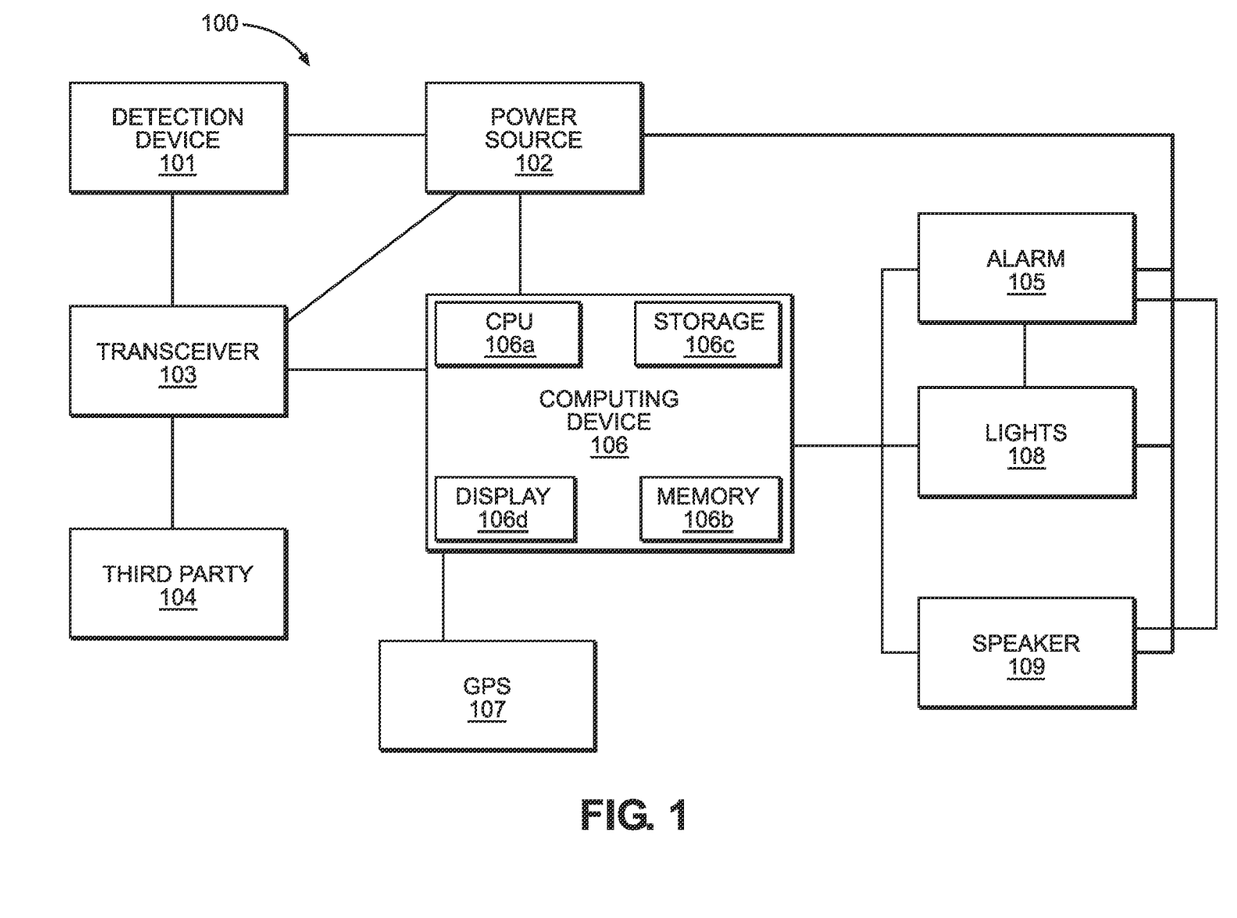
FIG. 1 shows a wiring diagram of an embodiment of the proximity alert system.

Referring now to FIG. 1, there is shown a wiring diagram of an embodiment of the proximity alert system. The proximity alert system 100 includes at first detection device 101. The detection device 101 is more fully described the description of FIG. 2. In other embodiments there are multiple detection devices used. In one embodiment multiple detection devices are used as redundancies. In another embodiment additional detection devices are used to provide different sensors (as described in FIG. 2).

The detection device 101 is operably coupled to a power source 102. In one embodiment the power source 102 may be a vehicle battery. In another embodiment the power source 102 may be a separate additional power source for the sole purpose of operating the proximity alert system 100. In yet further embodiments multiple power sources may be used.

In one embodiment the there is a transceiver 103 operably coupled to the detection device 101. In one embodiment the transceiver 103 is a wireless transceiver. In one embodiment the transceiver 103 may be a specific transceiver allocated specifically to the proximity detection system. In another embodiment the transceiver 103 is already incorporated into a vehicle's existing systems. In several embodiments as discussed throughout the transceiver 103 will be used to notify a third party 104 of the proximity warnings. In various embodiments the transceiver 103 will also be used to transmit vehicle information to a third party 104. For purposes of this disclosure a third party 103 is defined as anyone not directly located within the vehicle.

On one embodiment the detection device 101 is operably coupled to an alarm 105. In one embodiment the alarm 105 is a standalone component. In this embodiment the alarm 105 is capable of notification of a proximity detection. Further, in one version of this embodiment the alarm 105 is capable of triggering other notification devices. In other embodiments the alarm 105 is a computing device 106.

The computing device 106 is comprised of a CPU 106a operably coupled to a memory 106b and a storage device 106c. In a further embodiment the computing device 106 is further comprised of a display 106d. In one embodiment the computing device 106 is operably coupled to a GPS 107. The GPS 107 will calculate the location of the vehicle. The computing device 106 is further operably coupled to notification systems. In one embedment a notification system is at least one light 108. In another embodiment a notification system is at least one speaker 109.

In one embodiment a software is stored within the storage device 106c. The software is operated by the CPU 106a. In these embodiments the software via the computing device 106 will trigger various notification systems. The software will receive data from the at least one detection device 101. In various embodiments the software will trigger alarms via the notifications systems. In a further embodiment the software will display proximity warnings on the computing devices 106 display 106d. In yet a further embodiment the software will trigger the computing device 106 to send the vehicles location to a third party.

Figure 2:
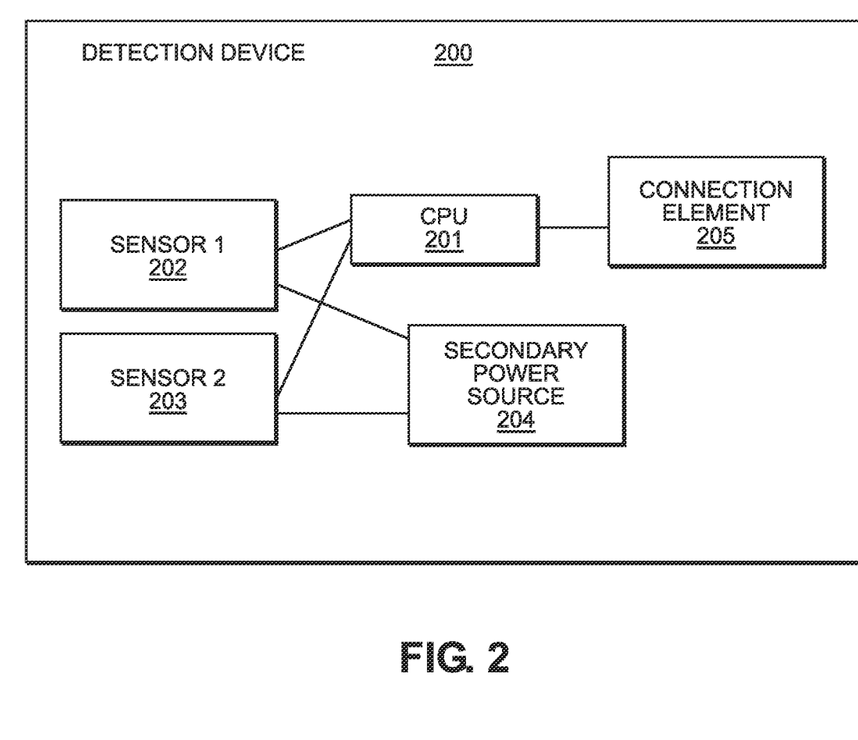
FIG. 2 shows a wiring diagram of an embodiment of the device for proximity alert system.

Referring now to FIG. 2, there is shown a wiring diagram of an embodiment of the device for proximity alert system. In one embodiment the detection device 200 is comprised of a CPU 201. The CPU 201 is operably coupled to at least a first sensor 202. In one embodiment the first sensor 202 is one selected from the group: sonar, radar, or infrared (night-vision), a motion detector, and a visual spectrum camera. In various embodiments the CPU 201 is operably coupled to at least a second sensor 203. In one embodiment the second sensor 202 is one selected from the group: sonar, radar, or infrared (night-vision), a motion detector, and a visual spectrum camera. In further embodiments more than two sensors are included within the detection device 200. The use of multiple sensors may be for redundancy within the detection device. In another embodiment each sensor may use a different type of sensor such that each detection device 101 has more than one type of detection.

In one embodiment the CPU 201 and the sensor(s) 202, 203 are each operably coupled to a secondary power source 204. The secondary power source 204 is additional to the power source of FIG. 1. The secondary power source 204 will enable the detection to still operate in the event of a failure by the first power source of FIG. 1. In one embodiment the CPU 201 includes at least one connection element 205. The connection element 205 will allow the detection device 101 to be coupled with the rest of the proximity detection system 100. In one embodiment the connection element 205 is a wired element. In another embodiment the connection element 205 is a wireless element.

Figure 3:
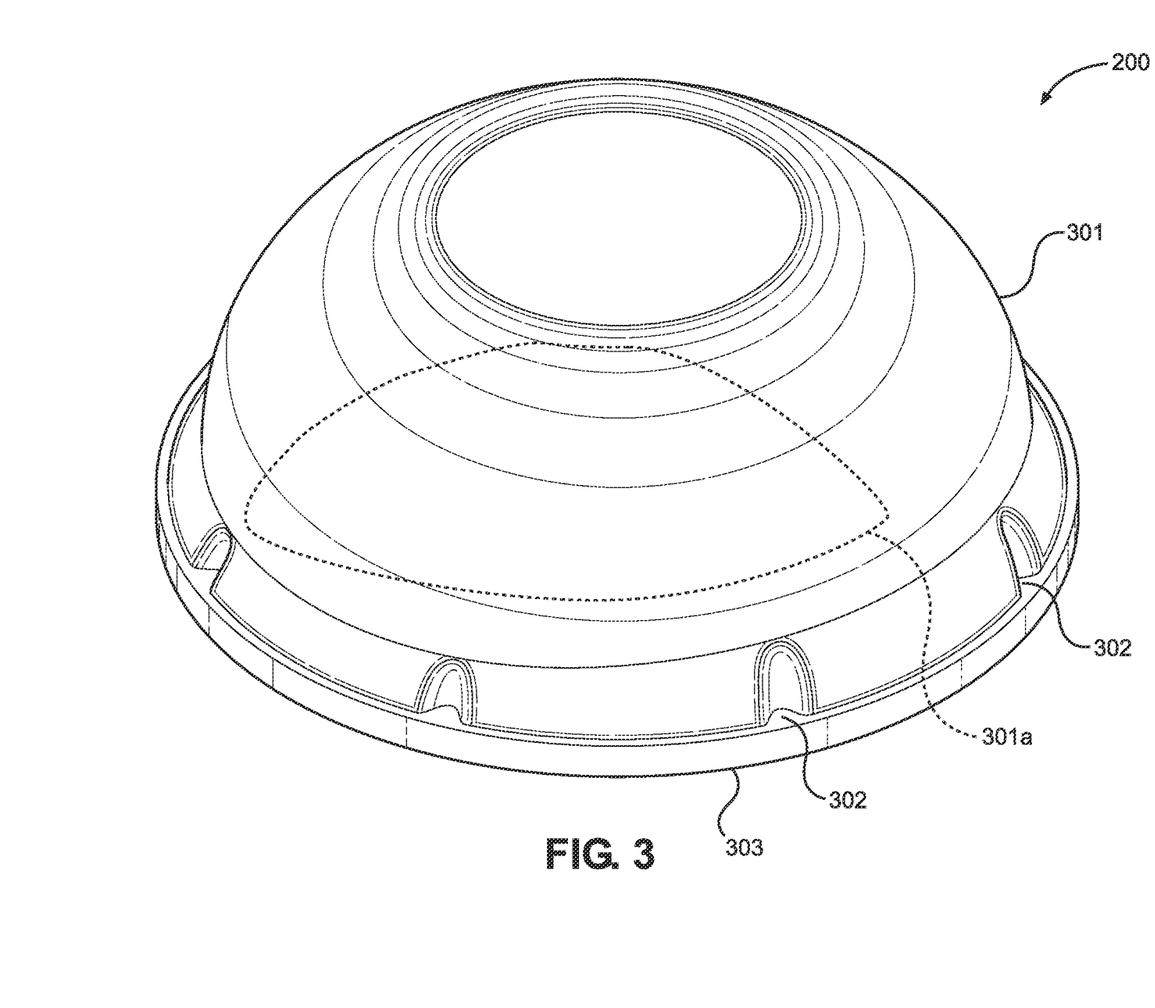
FIG. 3 shows a perspective view of an embodiment of the device for proximity detection.

Referring now to FIG. 3, there is shown a perspective view of an embodiment of the device for proximity detection. In one embodiment the detection device 200, in addition to the components of FIG. 2, includes a housing 301. In one embodiment the housing 301 is a dome shape. In another embodiment the housing 301 is of another shape which will hold the necessary components. In one embodiment the housing 301 is made from a shatter resistant material. This will prevent breaking or tampering with the device.

The housing 301 has an interior volume 301a. The interior volume 301a will allow for the various components of the proximity detection device 100 to be stored therein. In some embodiments the interior volume 301a is sectioned. This will allow for the separation of components.

In one embodiment the housing 301 is an integral part of the vehicle. Meaning that the proximity detection device 200 is built as part of the vehicle. In another embodiment the proximity detection device 100 is mounted to and installed upon the vehicle as an after-market part. That is not to say it cannot be factory installed. See the description of FIG. 4 for a discussion of the possible mounting locations for the proximity device 100.

In the latter embodiments the housing 301 has attachment points 302. These attachment points 302 will allow for fasteners to secure the proximity detection device 200 to the vehicle. In one embodiment the attachment points 302 of the housing 301 are used to secure the housing 301 to a mounting plate 303. The mounting plate 303 may be affixed to the vehicle prior to the proximity detection device 200 being mounted to the mounting plate 303. In one embodiment the mounting plate 303 is permanently affixed to the vehicle. In another embodiment the mounting plate 303 is removably affixed to the vehicle.

Figure 4:
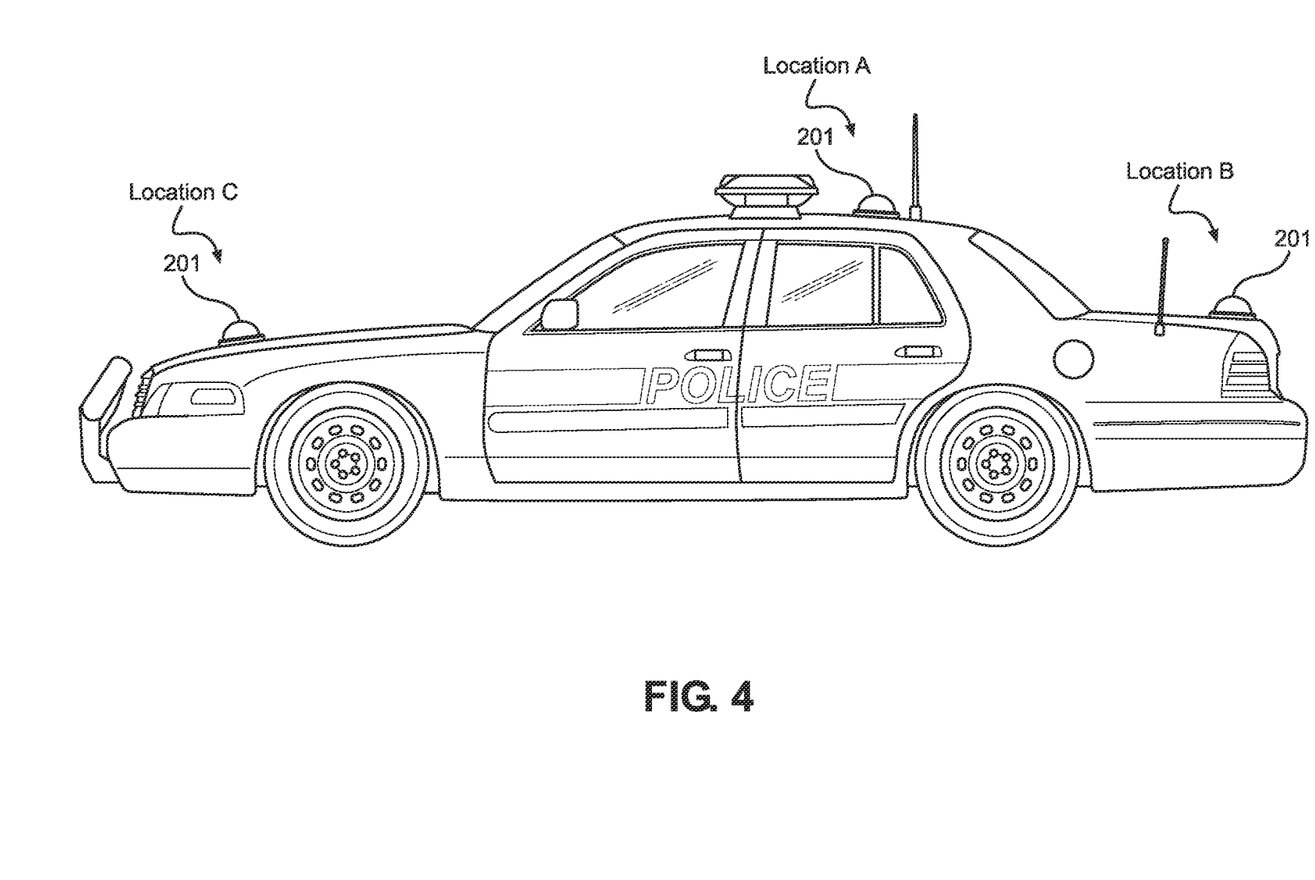
FIG. 4 shows a side view of an embodiment of a vehicle with at least one proximity device installed thereon.

Referring now to FIG. 4, there is shown a side view of an embodiment of a vehicle with at least one proximity device installed thereon. In the shown embodiment the sample vehicle is a police vehicle, specifically a car. However, this example is not to be limiting. It is contemplated that this device may be successfully employed on any motor vehicle. For example, but not limited to, a troop transport, a tank, a police SUV, or a mini-van.

In the shown embodiment the proximity detection device 201 is shown location in three places. In one embodiment a proximity detection device 201 is only located in one location. In another embodiment multiple devices 201 are place in various locations and will work together to give a more accurate reading. In one embodiment the multiple devices 201 may be used as a redundancy. The placement of the devices 201 are not to be read as limiting but merely examples of possible placements. Depending on the vehicle placements may vary. Further depending on the nature of use the amount of necessary devices may vary.

In the shown embodiment a proximity detection device 201 is shown at location A. Location A is the roof of the vehicle. In this example Location A is specifically at the rear of the roof. This will allow for the light bar and the proximity detection device 201 to each have the working space required.

Another proximity detection device 201 is shown at location B. Location B is location on the truck of the vehicle. In the shown embodiment location B is shown on the top of the trunk. However, location B could also be moved to the rear of the trunk area.

Yet a further proximity detection device 201 is shown at location C. Location C is location on the hood of the vehicle. In the shown embodiment location C is shown on the top of the hood. However, location C could also be moved to the front of the hood area or even to the grill of the vehicle.

Figure 5A:
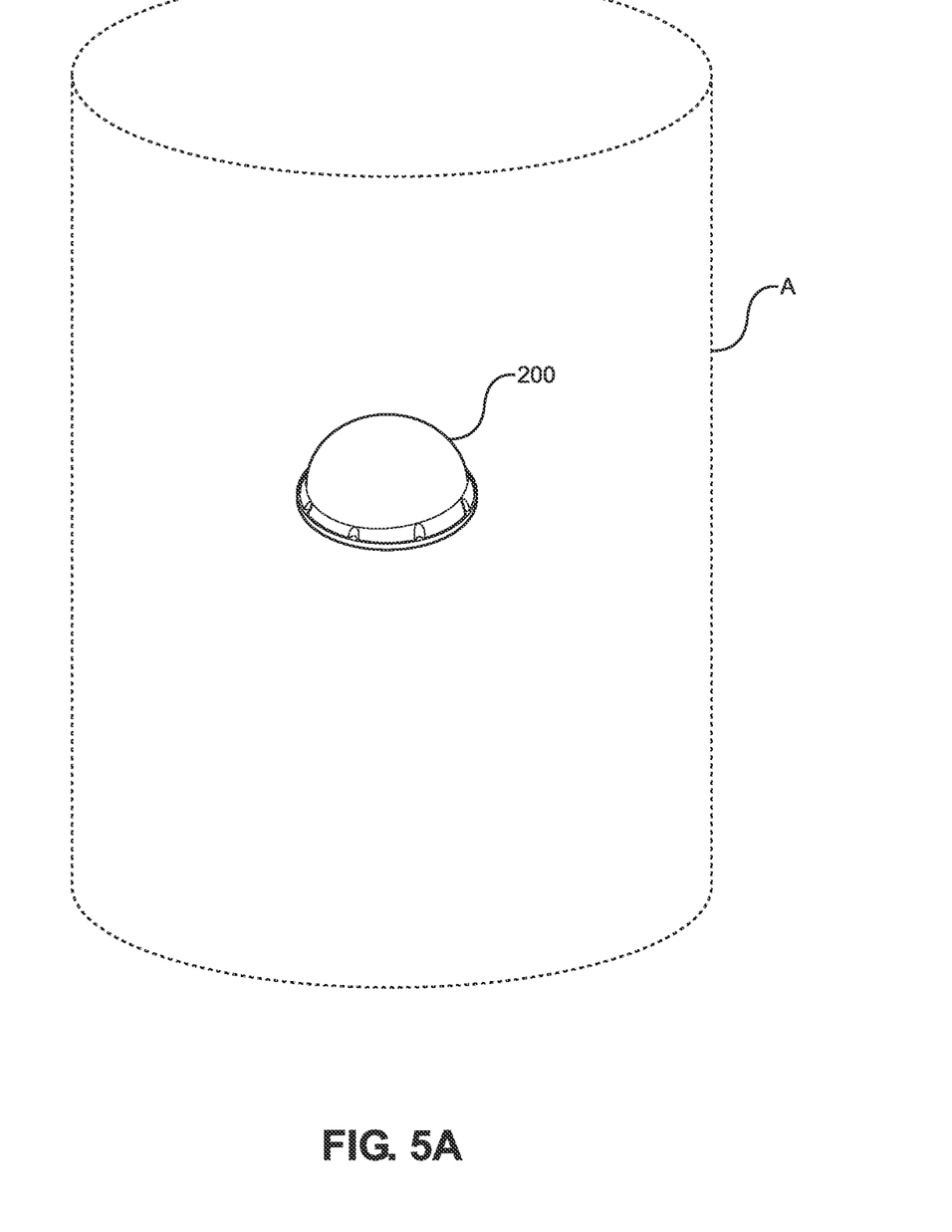
FIG. 5A shows a perspective view of an embodiment of the proximity detection device and the field of detection.
Figure 5B:
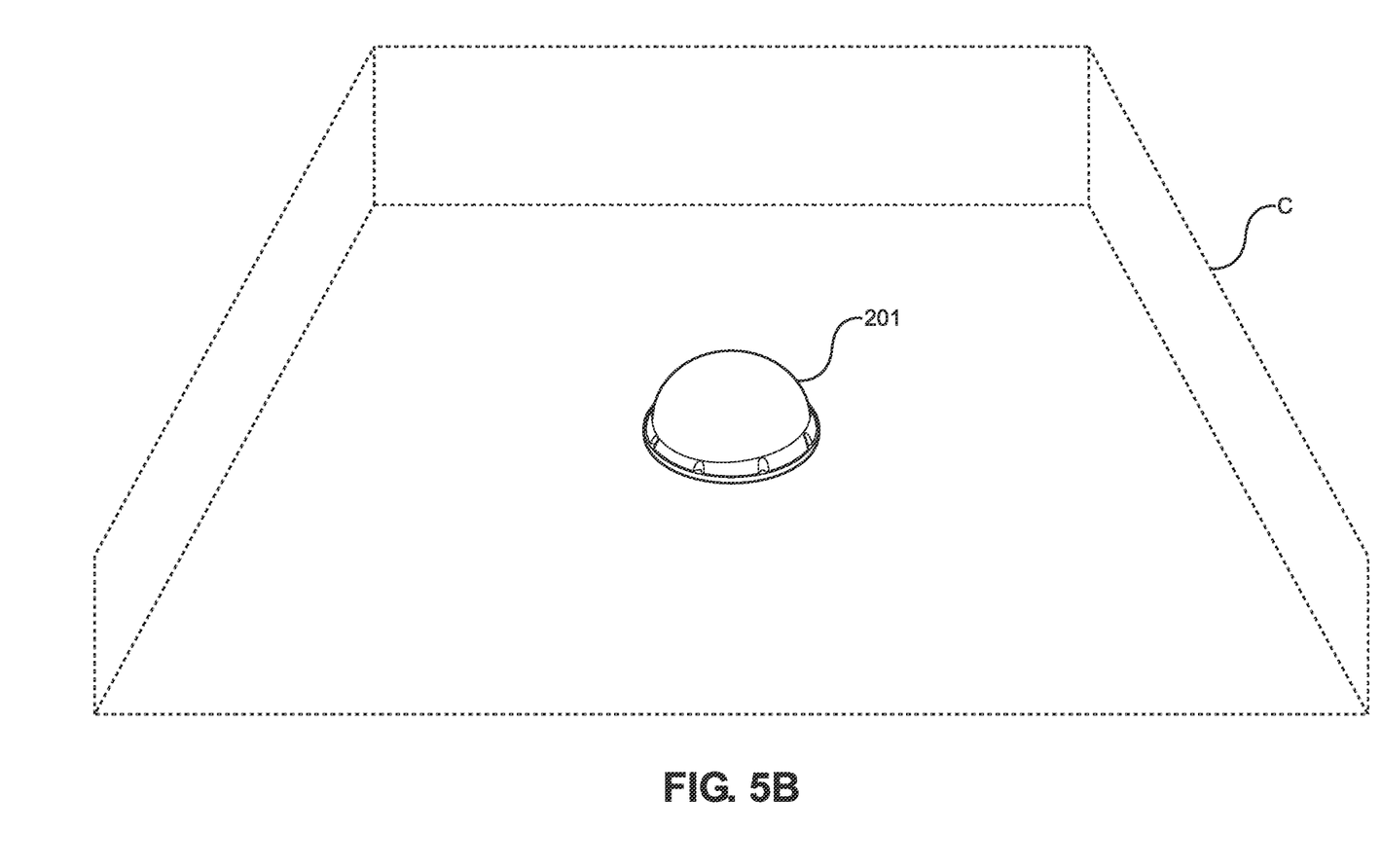
FIG. 5B shows a perspective view of an embodiment of the proximity detection device and the field of detection.
Figure 5C:
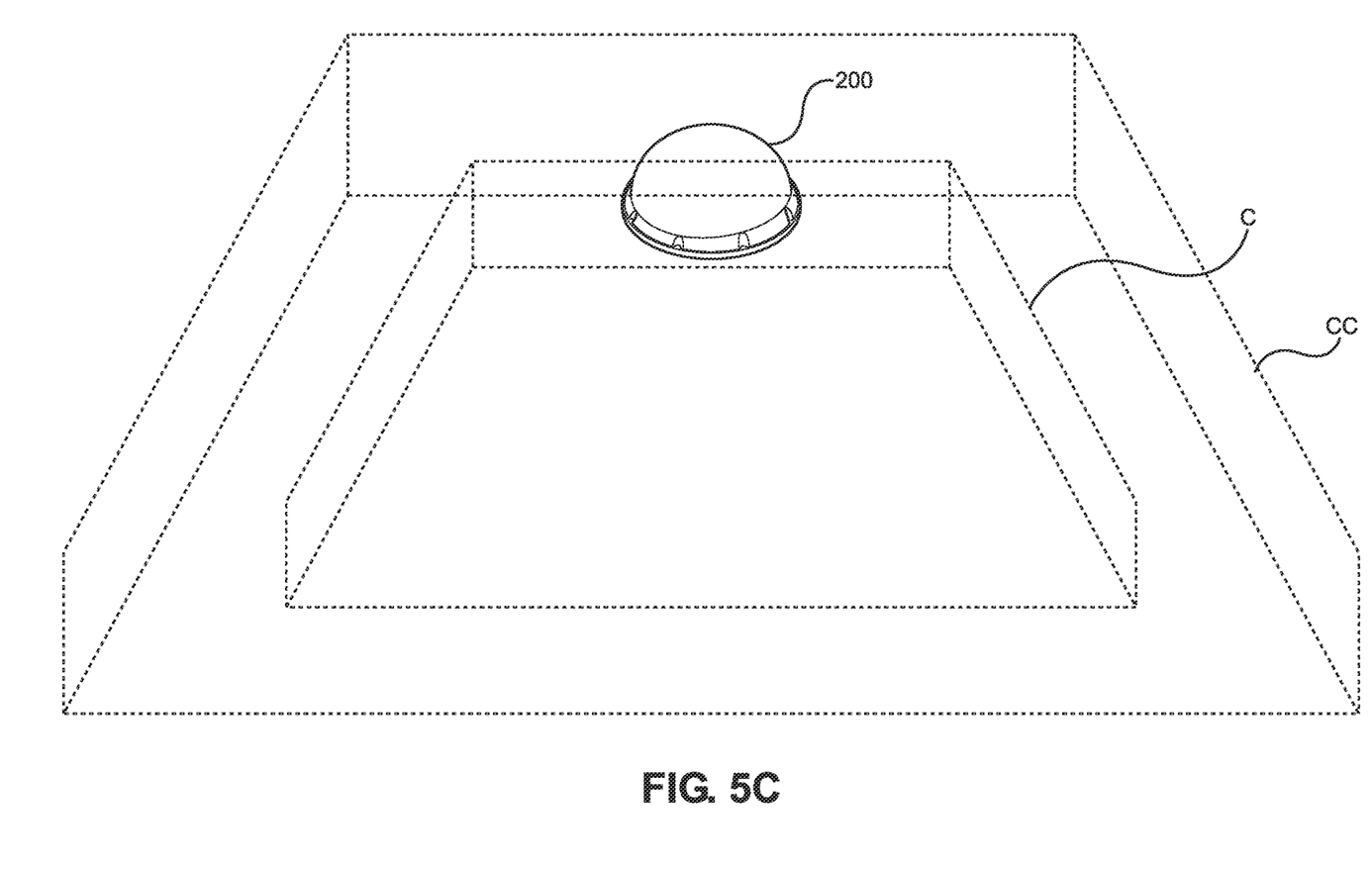
FIG. 5C shows a perspective view of an embodiment of the proximity detection device and the field of detection.

Referring now to FIG. 5A-FIG. 5C, there is shown perspective views of embodiments of the proximity detection device and fields of detection. In different embodiments different fields of detection may be employed. In each embodiment the detection device 200 is shown in an example location relevant to the fields. The fields of detection may be the result of different sensors. Further, the different fields of detection may be the result of a specified choice. For example, limiting the detection to a certain perimeter and height due specific need, where this perimeter and height are not chosen because they are the maximums of the sensors.

In FIG. 5A, field of detection A is a cylinder shape. A cylinder may be used in a situation where the area above the vehicle is more important that the perimeter. Further, field of detection A may be coupled with another field of detection to provide a maximum field of detection. In the shown embodiment the detection device 200 is located in the center of the field of detection A.

In FIG. 5B, field of detection C is a trapezoid. In this embodiment a trapezoid will provide one of the greatest areas of detection. Further, a trapezoid will begin to limit the field of detection as the area moves away from the proximity detection device 201. In one embodiment this will help to extend the range of detection. In another embodiment this will conserve energy. Here the detection device is shown in the center of the field C.

In FIG. 5C, there are shown two fields of detection C and CC. Both fields of detection C and CC are trapezoids. In this embodiment field of detection C a smaller field than field CC. In one embodiment the different fields of detection are due to multiple detection devices being used. In another embodiment the different fields of detection are due to multiple sensors being used in a single detection device. In one embodiment multiple fields of detection will result from a combination of detection devices and sensors. In this example the detection device is shown located at the top of field C and just below the top of field CC.

In one embodiment the different fields of detection will result in different alarms being raised. For example, if motion is detected at field CC the headlights of the vehicle may be activated. Further, a notification may be shown to a vehicle occupant. In one embodiment if motion is detected at field of detection C a more advanced alarm will be activated. For example, a siren may sound or in the case of a police vehicle the strobe lights may be activated.

Figure 6:
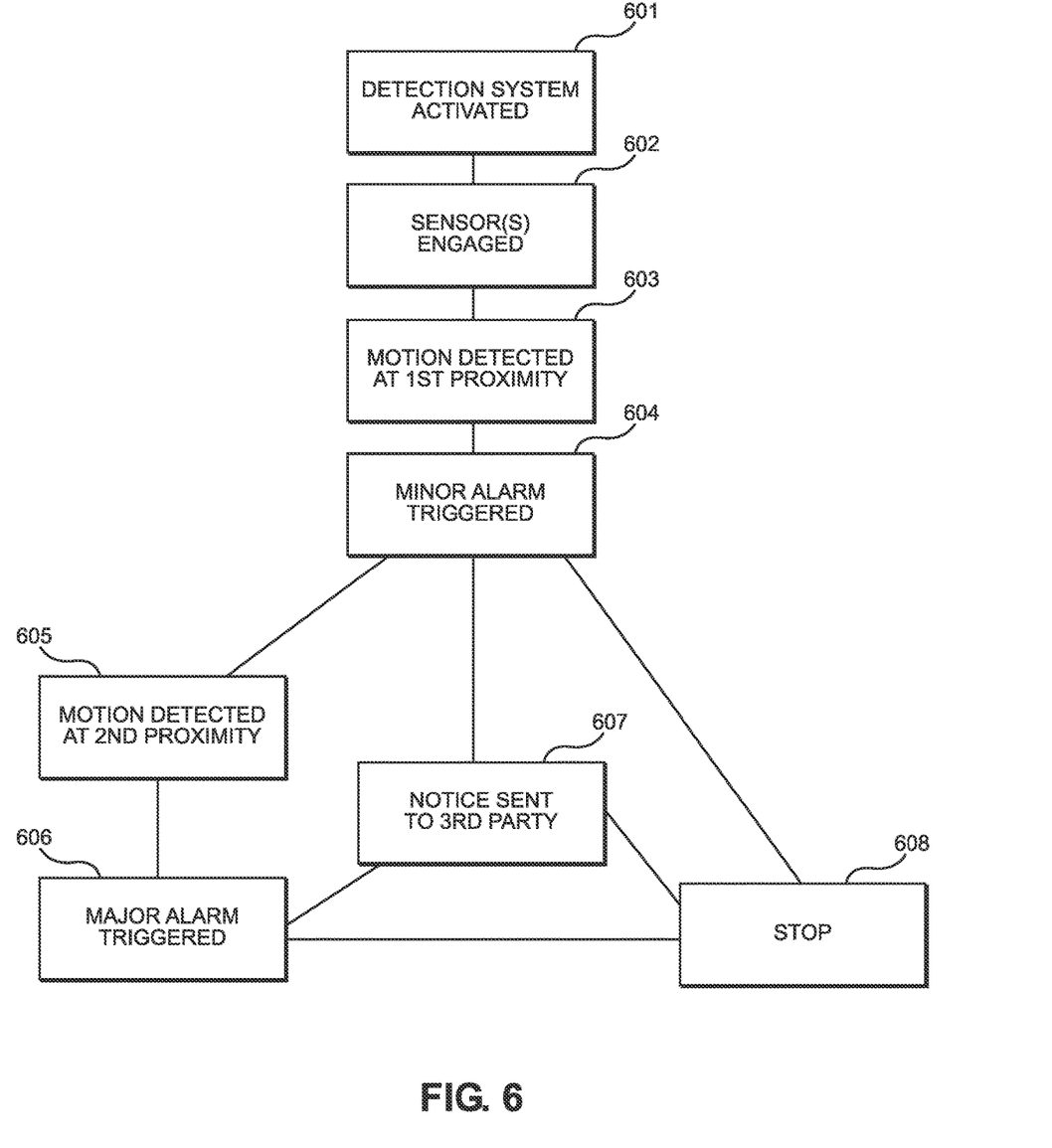
FIG. 6 shows a flow chart of one embodiment of how the proximity detection device may function within the system.

Referring now to FIG. 6, there is shown a flow chart of one embodiment of how the proximity detection device 201 may function within the system. The method begins when the detection system is activated 601. In one embodiment the detection system is activated 601 when the vehicle is turned on. In another embodiment the system is activated when a specific activation action is taken. Once the detection system is activated 601, the sensors are engaged 602.

A sensor will then detect motion at a first proximity 603. At this time an alarm will be triggered 604. In one embodiment this alarm is a minor alarm. After the alarm is triggered 604, in one embodiment the method will end 608. In another embodiment notice is sent to a third party that an alarm has been triggered 607. In yet a third embodiment motion may then be detected at a second proximity 605. In one embodiment the second proximity 605 is closer to the vehicle than the first proximity 603.

After motion is detected at a second proximity 605 another alarm is triggered 606. In one embodiment this alarm is a major alarm. This means that the alarm will activate additional notifications from the first alarm. In one embodiment after the second alarm is activated the method stops 608. In another embodiment after the second alarm is triggered 606, a third party is notified that the alarm was triggered. After this the method will stop 608.

It is therefore submitted that the invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for alerting an occupant of a vehicle of a threat located exterior to the vehicle, wherein the system comprises:
    a power source mounted on the vehicle;
    a transceiver operably coupled to the power source;
    a computing device operatively coupled to the transceiver, wherein the computing device is operably coupled to the power source and to a GPS adapted and configured to determine the location of the vehicle;
    a detection device operably coupled to the power source and to the transceiver, wherein the detection device includes a CPU operatively coupled to a first sensor, wherein the CPU is operatively coupled to a second sensor, wherein the transceiver is adapted and configured to transmit to at least one person exterior to the vehicle information involving at least one threat directed toward the occupant of the vehicle;
    a housing dimensioned and configured for containing the detection device; and
    an attachment means adapted and configured for attaching the housing containing the detection device to the vehicle.

2. The system of claim 1, wherein the threat is proximate to the vehicle.

3. The system of claim 1, wherein the power source is a vehicle battery.

4. The system of claim 1, wherein the vehicle is stationary.

5. The system of claim 1, wherein the vehicle is a tank.

6. The system of claim 1, wherein the vehicle is a troop transport.

7. The system of claim 1, wherein the vehicle is a police SUV.

8. The system of claim 1, wherein the vehicle is a mini-van.

9. The system of claim 1, further including a notification system including a light or a speaker.

10. The system of claim 1, wherein the second sensor is operatively connected to a second power source, and wherein the second sensor is a sonar device.

11. The system of claim 1, wherein the second sensor is operatively connected to a second power source, and wherein the second sensor is a radar device.

12. The system of claim 1, wherein the second sensor is operatively connected to a second power source, and wherein the second sensor is a night-vision device.

13. The system of claim 1, wherein the second sensor is operatively connected to a second power source, and wherein the second sensor is a motion detector.

14. The system of claim 1, wherein the second sensor is operatively connected to a second power source, and wherein the second sensor is a visual spectrum camera.

15. The system of claim 1, wherein the housing is made of a shatter-resistant material.

16. The system of claim 1, wherein the attachment means is a mounting plate.

17. The system of claim 15, wherein the attachment means is a mounting plate.

* * * * *